Oct. 31, 1933.　　　　M. H. HILL　　　　1,932,781

MACHINE FOR CUTTING GEARS AND CHAMFERING ATTACHMENT THEREFOR

Filed March 14, 1931　　　5 Sheets-Sheet 1

Fig. 1

INVENTOR
Maxwell H. Hill
BY
HIS ATTORNEY

Fig. 2

Oct. 31, 1933.          M. H. HILL          1,932,781

MACHINE FOR CUTTING GEARS AND CHAMFERING ATTACHMENT THEREFOR

Filed March 14, 1931     5 Sheets-Sheet 5

INVENTOR
Maxwell H. Hill
BY
his ATTORNEY

Patented Oct. 31, 1933

1,932,781

UNITED STATES PATENT OFFICE 1,932,781

MACHINE FOR CUTTING GEARS AND CHAMFERING ATTACHMENT THEREFOR

Maxwell H. Hill, Rochester, N. Y., assignor to Gleason Works, Rochester, N. Y., a corporation of New York Application March 14, 1931. Serial No. 522,538

27 Claims. (Cl. 90—4)

The present invention relates to the chamfering of the teeth of gears and particularly to the chamfering of the teeth of bevel and hypoid gears.

A primary object of this invention is to reduce the cost of the chamfering operation by eliminating the necessity for special machines for this purpose and by eliminating the necessity for a separate and special chamfering operation with the special handling heretofore required.

A further object of this invention is to provide a machine on which gears may not only be cut but also chamfered and this without any increase in the time of the cutting operation and without appreciable complication in the construction of the machine or its operation.

A still further object of this invention is to provide a chamfering attachment which may be applied to and used on existing gear cutting machinery and which will enable the chamfering of the teeth to be carried on simultaneously with the cutting of the gear teeth.

Heretofore, separate machinery has been required for cutting the teeth of gears and for chamfering such teeth. Gears were roughed on a gear rougher and then chamfered, or were both roughed and finished on gear roughing and finishing machines before chamfering. The chamfering operation required special equipment unless done by hand and in either case entailed a separate operation. With the present invention, gears can be both cut and chamfered on the same machine and in fact, both operations are carried on simultaneously.

In the preferred embodiment of the invention, shown in the drawings, I have adapted a spiral bevel gear rougher of the type described in the patent to E. W. Bullock et al., No. 1,351,200 of August 31, 1920 so that simultaneously with the rough-cutting of the teeth of a gear, one end of the teeth can be chamfered and this in one set-up of the machine.

In machines of the type shown in the Bullock et al. patent, the indexing mechanism is actuated from an oscillatable rail which is operated by a cam driven in time with the cutting and feed operations of the machine. In the embodiment of the present invention shown in the drawings, the chamfering apparatus is secured to the work head of the machine and is actuated from the same oscillatable rail which is used to operate the indexing mechanism. Thus the cutting, indexing and chamfering operations may be timed together so that each may proceed in its proper sequence.

In the operation of the machine illustrated in the drawings, a tooth space is cut, then the blank is indexed, and then the tooth is chamfered.

A chamfering apparatus constructed according to the embodiment illustrated in the drawings can be used on existing spiral bevel gear roughing machines of the type shown in the Bullock et al. patent without material modification of such machines or of their principle of operation. Thus through the present invention, existing gear cutting machinery can be equipped at small cost to perform an additional operation heretofore requiring separate and special machinery.

It will be understood, of course, that my invention is not limited to the particular modification shown but that since it involves the broadly new idea of cutting and chamfering gears on a single machine, it is susceptible of various different applications and of wide structural modification.

Figure 1:
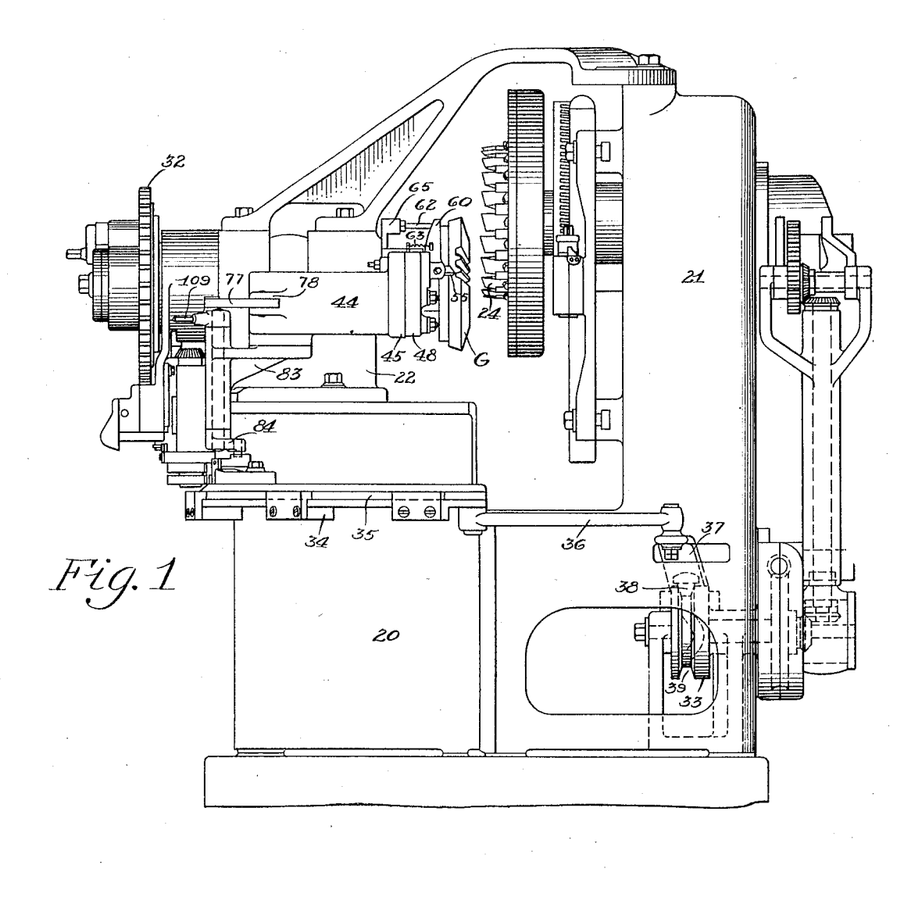
Figure 1 is a side elevation of a spiral bevel gear rougher constructed according to the Bullock et al. patent and equipped with chamfering apparatus constructed according to the present invention.
Figure 2:
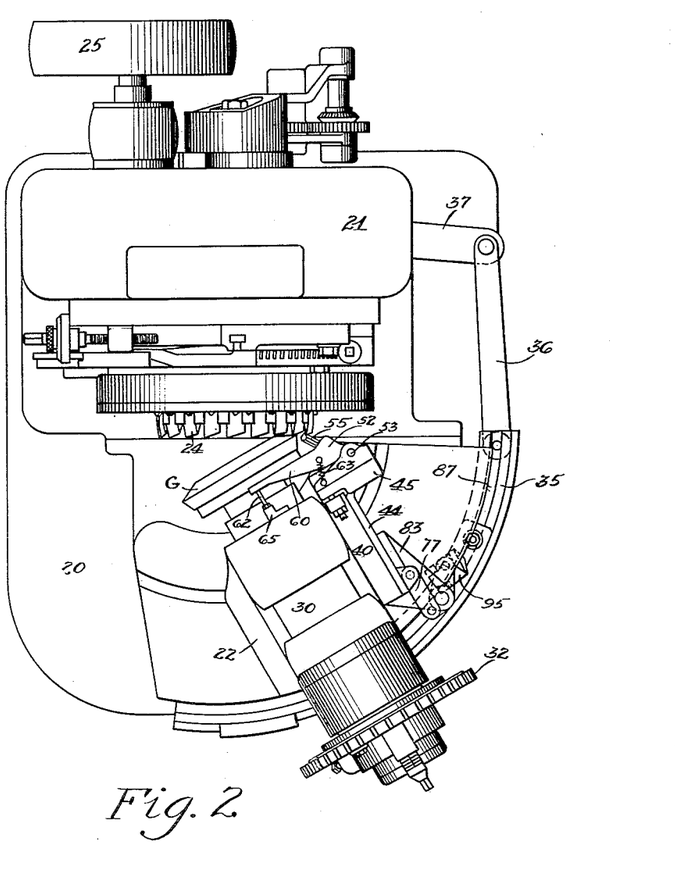
Figure 2 is a plan view of the combined cutting and chamfering machine.

Referring to the drawings by numerals of reference, 20 indicates the base or frame of the machine. There is a column 21 formed integral with the base of the machine and the tooth cutting mechanism is housed in this column. The work head, designated at 22 is adjustably mounted on the base of the machine. The tooth cutting tool is a face mill gear cutter, designated at 24. This cutter is adjustable on the column 21 to position it for cutting teeth of different spiral angles. It is rotated continuously during the operation of the machine, cutting by its rotation longitudinally curved teeth on the gear blank. The cutter has an alternate movement of feed and withdrawal toward and away from the gear blank. On the feed motion, a tooth space is cut in the blank, while when the cutter is withdrawn from engagement with the blank, the blank is indexed and a tooth chamfered. The adjustments of the cutter and the means for driving the same and for imparting to the cutter its alternate movement of feed and withdrawal form no part of the present invention. The same adjustments and the same means may be employed as are described in the patent to Bullock et al. above mentioned and in the patent to Bullock et al. No. 1,385,200 of July 19, 1921. Power is imparted to the machine through the pulley 25 (Fig. 2).

The gear blank G to be cut and chamfered is secured by any suitable chucking mechanism, as for instance, the nut 27 and disc 28, to the work spindle 30 of the machine. The work spindle is journaled in the work head 22. It is locked against rotation, during the cutting of the teeth of the blank and during chamfering, by the index mechanism of the machine. The index mechanism forms no part of the present invention and may be of any suitable character. In the machine illustrated in the drawings, an indexing mechanism is employed of the same type described in the Bullock et al. Patent No. 1,351,200 above mentioned. This index mechanism, of which the index plate is designated at 32 is operated from a cam 33 (Fig. 1) that is driven from the pulley 25 through gearing as described in Patent No. 1,351,200.

The base of the machine is provided with a curved guide or track 34 within which moves a slide or rail 35 which carries the actuating means, described in Patent No. 1,351,200, for operating the index mechanism. The rail 35 is pivotally connected to a connecting rod 36 which is, in turn, pivotally connected to a lever 37 that carries a roller 38 which engages in the cam slot 39 of the cam 33. The trackway of the cam 33 is so formed that the lever 37, connecting rod 36 and rail 35 are stationary during the cutting of the tooth spaces of the blank, but are oscillated periodically when the cutter 24 is withdrawn, as described in Patent No. 1,351,200. The oscillating motion of the rail 35 is employed in the improvement constituting one embodiment of the present invention to operate not only the indexing mechanism but the chamfering mechanism also as will hereinafter be described. The construction of the chamfering mechanism will now be described.

40 designates a support or guide (Figures 3, 5 and 6) which is secured by screws 41 to one side of the work head 22. This support or guide is formed with a dove-tailed way in which a slide 44, that is formed with a portion engaging the dove-tailed way, reciprocates. The slide 44 is formed at its inner or front end with an enlarged head 45. There is a vertical T-slot 46 formed in the head 45.

48 designates a tool-head which is both horizontally and vertically adjustable on the head 45 of the slide 44. The tool head 48 is secured in any adjusted position on the slide 44 by T-bolts 49 which pass through elongated horizontal slots 50 in the tool head 48 and engage in the vertical T-slot 46 in the head 45 of the slide 44.

There is a tool-block 52 oscillatably mounted on the tool head 48, the taper pin 53 serving as a fulcrum or pivot therefor.

The chamfering tool, designated at 55 is secured in the tool block 52 by a set-screw 56 which engages the shank of the tool.

Figures 5, 6, 8, 9:
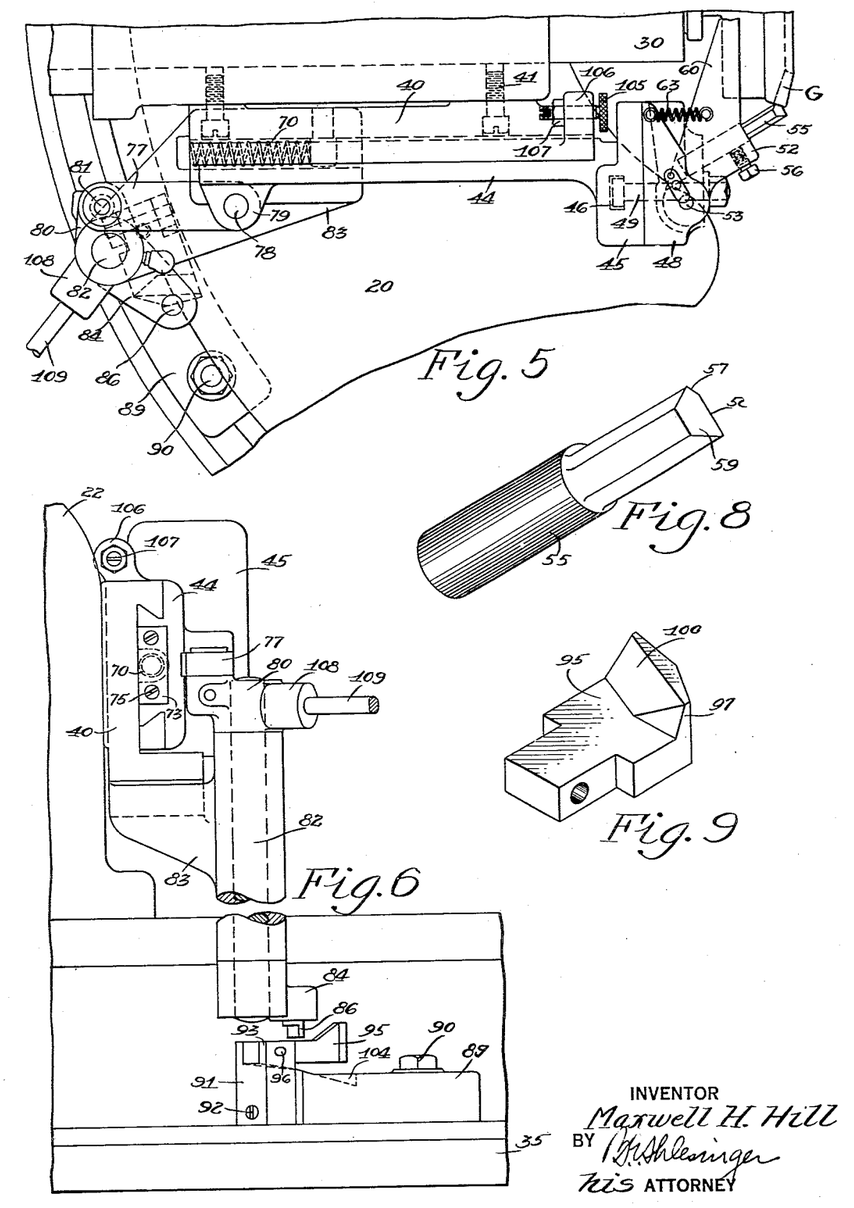
Figure 5 is a fragmentary plan view of the parts shown in Figure 3 but showing the chamfering tool about to take a cut.
Figure 6 is a fragmentary view of the machine, showing the chamfering mechanism in rear end elevation.
Figure 8 is a perspective view of the chamfering tool.
Figures 9 and 10 are perspective views of the cam which controls the operation of the chamfering mechanism, looking at the rear and at the front of the same, respectively.

The chamfering tool 55 is generally trapezoidal in cross section but one side or corner of it is milled away, as indicated at 57 to clear the bottom of the tooth spaces of the gear blank during the chamfering of the sides of the gear teeth. The cutting edge of the tool is designated at 58 and the front face 59 of the tool is given a suitable rake or shear to form this cutting edge.

Figure 7:
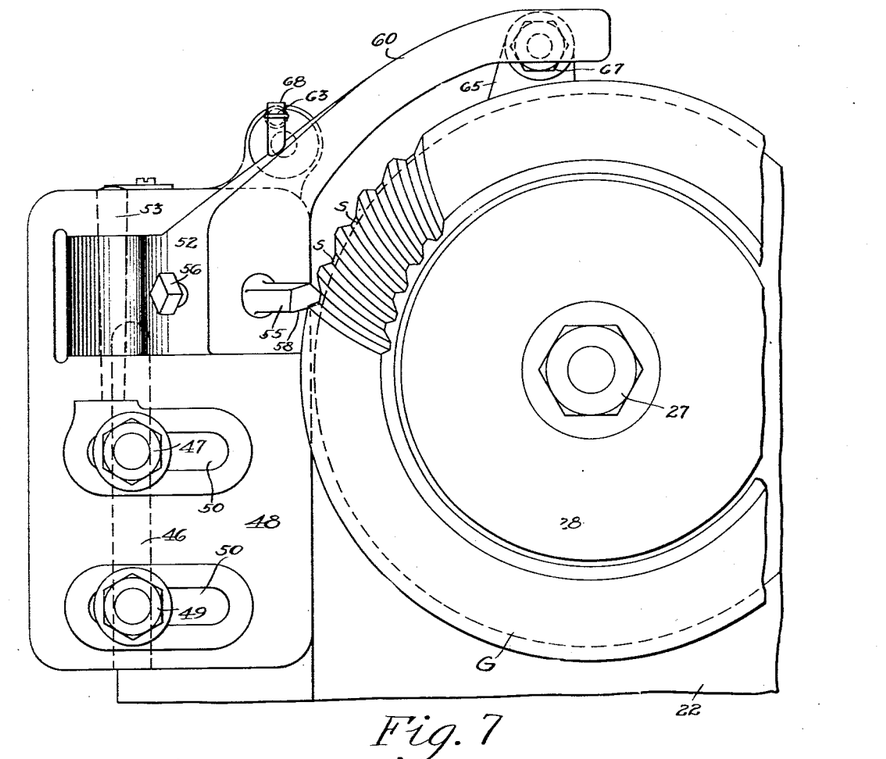
Figure 7 is a fragmentary front elevation of the work head, showing the chamfering tool taking its cut on the gear blank.
Figure 10:
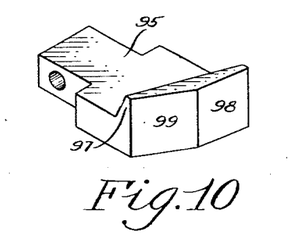

The tool block 52 is formed with an arm 60 that extends upwardly over the gear blank G, as clearly shown in Figure 7. The free end of this arm is held in contact with a stud 62 by a coil-spring 63. The stud 62 is adjustably threaded into a lug 65 that is secured by screws 66 to the front or inner end of the work head 22. A lock-nut 67 is provided to secure the stud 62 in any adjusted position. The coil spring 63 is secured at one end to a pin 68 fastened in the arm 60 and at its other end to a pin 69 fastened in the tool-head 48. The effect of the spring 63 is to hold the arm 60 in engagement with the stud 62 as the slide 44 reciprocates, thereby causing the tool 55 to swing about the point of engagement of the arm 60 with the stud 62 as the tool takes its cut.

Figures 3, 4:
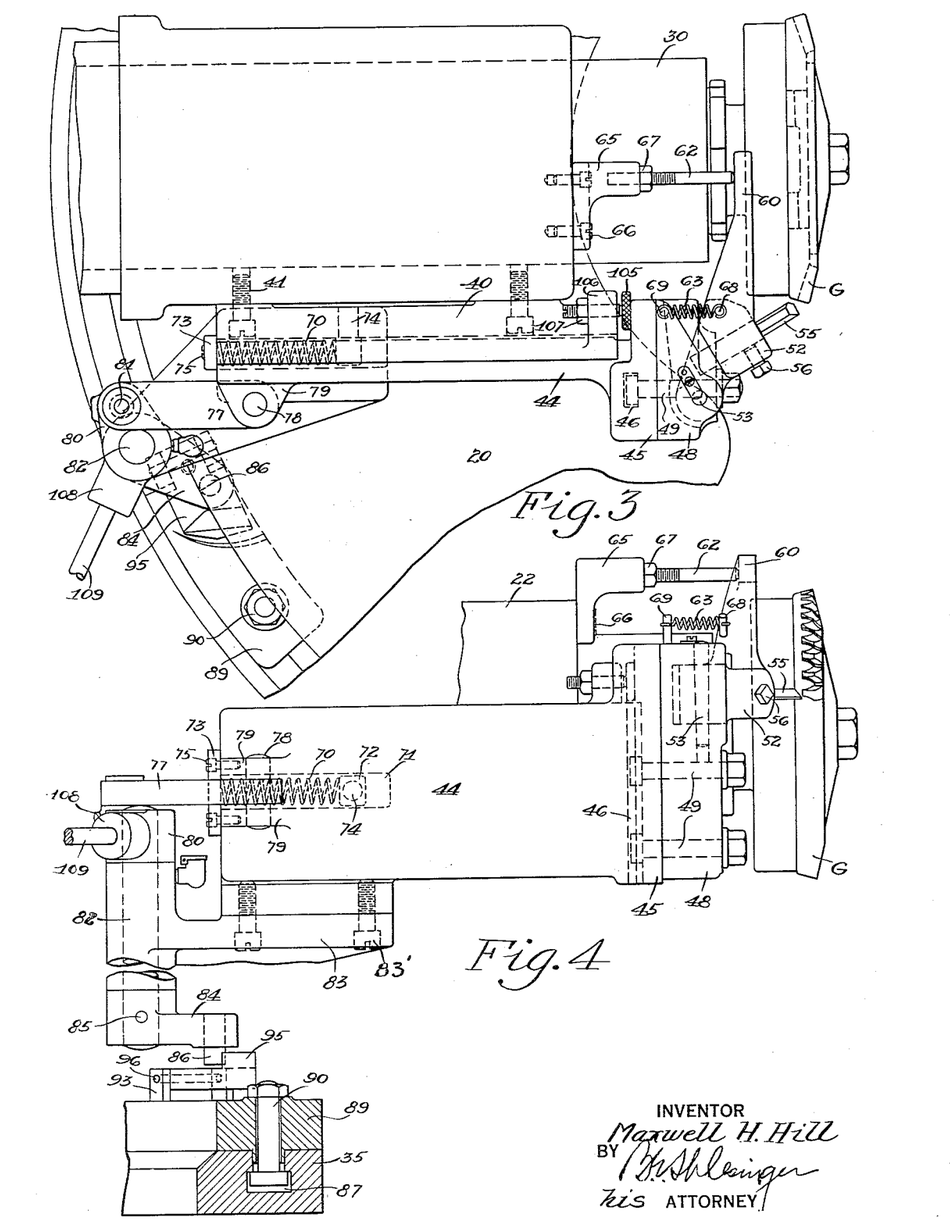
Figure 3 is a fragmentary plan view on an enlarged scale, showing details of the chamfering mechanism and its mounting, the chamfering mechanism being shown in its withdrawn or non-cutting position.
Figure 4 is a side elevation of the parts shown in Figure 3, the actuating rail being shown in section.

Figure 3 shows the withdrawn or non-cutting position of the chamfering tool 55. The tool is normally held in this position and is returned to this position by a coil spring 70 which is housed in a recess 71 formed in the back of the slide 44 and which is interposed between a block 72 and a plate 73. The block 72 is secured to the guide or support 40 by the pin 74, while the plate 73 is secured to the rear end of the slide 44, positioned to close the recess 71, by screws 75.

The cutting stroke is imparted to the chamfering tool 55 by actuation of a connecting-rod 77. This rod is pivotally connected at one end by means of a pin 78 to ears 79 cast integral with the slide 44. The connecting rod 77 is pivotally connected at its other end to a crank-member 80 by means of a pin 81. The crank member 80 is fastened to a shaft 82 which is journaled in a bracket 83 that is secured by screws 83' to the guide or support 40.

There is an arm 84 secured to the lower end of the shaft 82 by means of a pin 85 (Figure 4). There is a pin 86 secured in this arm 84 and one side of this pin is flatted off as clearly shown in Figures 3 and 6. The rail 35 has a curved T-slot 87 formed in its upper face and there is a block 89 adjustably secured to the rail 35 by means of the T-bolt 90. The head of this bolt engages in the slot 87. A block 91 is secured to the block 89 by screws 92. The block 91 is formed with ears 93 and between these ears is pivotally mounted a cam member 95, the pivotpin 96 connecting the cam member 95 with the ears 93.

The cam member 95 is formed with a projecting portion 97. The front face of this projecting portion 97 is formed with a cam surface provided by the surfaces 98 and 99 which are inclined to each other. The rear face of the projecting portion 97 is beveled off as indicated at 100.

When the rail 35 and with it the block 89 is moved upwardly from the position shown in Figure 3, that is, to the left from the position shown in Figure 4, the rounded side of the pin 86 engages the beveled surface 100 of the cam 95 and the cam is depressed against the resistance of a coil-spring 102 (Figure 11), which is housed in the block 91 and contacts the lower face of the cam 95. Thus, the cam 95 is swung down and out of the way without actuating the arm 84 or the crank-member 80. The pin 86 thus becomes positioned in front of the cam surface constituted by the surfaces 98 and 99 and assumes the position shown in Figure 5. When the direction of the movement of the rail 35 is reversed, the flatted surface of the pin 86 engages the cam surfaces constituted by the surfaces 98 and 99 and rides on these surfaces, rocking the arm 84, the shaft 82 and the crank member 80 to move the slide 44 forward against the resistance of the spring 70 and cause the chamfering tool 55 to take a chamfering cut. In this cut, as stated above, the tool has a swinging or arcuate motion due to the fact that as the slide 44 advances, the arm 60 is held continuously in engagement with the stud 62 by the spring 63. I have found that this swinging motion of the tool gives a better type of chamfer, but it may be omitted if desired.

When the pin 86 has cleared the cam surface of the cam 95, the slide 44 is quickly returned to its rearward position by the spring 70, thus moving the tool 55 quickly out of engagement with the gear blank. An adjustable stop-screw is provided, as indicated at 105 (Figures 3 and 5) to permit adjustment of the stroke of the slide 44. This screw threads into a lug 106 formed on the guide or support 40 and is held in any adjusted position by the lock-nut 107.

Figure 11:
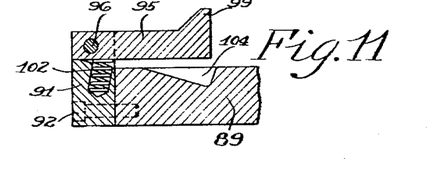
Figure 11 is a fragmentary sectional view, showing details of the mounting of the actuating cam.

The block 90 is provided with a recess 104, as shown in Figures 6 and 11, to allow the cam 99 to be rocked downwardly as required on the movement of the rail 35 to the left from the position shown in Figures 4 and 6.

The crank member 80 is formed at one side with a boss 108 and this boss is formed with a hole in which a bar 109 may be inserted to operate the slide manually to move the chamfering tool to or from cutting position. This is of particular use in setting up the machine.

In the use of the machine, the tool mechanism for cutting the gear teeth and the work spindle are adjusted as usual for cutting a gear of the desired spiral and root angles and of the desired cone distance. The chamfering tool 55 is adjusted into the most suitable position for chamfering the teeth of the blank. There is an angular adjustment of this latter tool made possible by rotating the shank of the tool in the socket in which it is mounted in the tool-block 52. Other adjustments of the chamfering tool required for cutting gears of different diameters and required to position the tool so that it will properly chamfer the teeth of the gear, can be effected by adjusting the tool head 48 horizontally and vertically on the front face of the guide 40, the head 48 being secured in position after adjustment by means of the T-bolts 49.

When all of the adjustments have been made, the machine is started. The rotating face mill cutter 24 first feeds into depth, cutting a tooth space S of the gear blank G. Then the face mill cutter 24 is withdrawn. As soon as the cutter 24 has cleared the blank, the cam 33 operates to oscillate the rail 35 through the lever 37 and connecting rod 36. At this time, the pin 86 is in the position shown in Figures 3 and 4, and as the rail 35 moves to the left from the position shown in Figures 1 and 4, the cam member 95 is rocked downwardly against the resistance of the spring 102 and no movement is imparted to the slide 44. As the rail 35 continues to move to the left under actuation of the cam 33, it operates the index mechanism of the machine in the manner described in the Bullock et al. Patent No. 1,351,200, indexing the gear blank G to bring the tooth space which has been cut by the tool 24 into alignment with the chamfering tool 55 and to bring a new portion of the blank into position where it will be cut upon the next feed movement of the cutting tool 24. The cam 33 then reverses the rail 35 moving it back to the right. In this movement, the index mechanism is reset as described in Patent No. 1,351,200. At the same time, also, the pin 86, which is now in the position shown in Figure 5 is engaged by the cam surface 98—99 of the cam 95. It rides on this surface, rocking the arm 84, shaft 82 and crank member 80 to move the slide 44 forward and cause the tool 55 to chamfer the outer end of the concave side of the tooth space cut by the tool 24. When the rail 35 has moved far enough back to the right (Figure 1) so that the pin 85 has cleared the cam surface of the cam 95, the chamfering tool 55 is quickly moved out of engagement with the blank G by the spring 70. Then the cutter 24 is fed into depth to cut a new tooth space in the blank. During the feeding operation, the rail 35 remains stationary as before, since the roller 38 is traveling in the dwell portion of the track-way 39 of the cam 33. When the cutter has again been withdrawn, the blank is indexed and another tooth of the gear is chamfered. The alternate cutting, indexing and chamfering proceeds until the gear blank has been completely roughed and chamfered.

Figure 12:
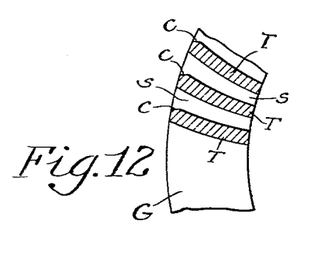
Figure 12 is a fragmentary sectional view of a spiral bevel gear cut and chamfered on a machine constructed according to this invention, showing the nature of the chamfering cut.

The nature of the chamfering cut is shown in Figure 12 where S indicates the tooth spaces cut in the gear blank G, T the teeth formed by these cuts and C the chamfered outer ends of the concave sides of these teeth. The chamfering operation removes the rear corners of the concave sides of the teeth, thus removing the burr left by the face mill cutting tool 24 and also removing a weak point or corner from the tooth which might, otherwise, be liable to break off in use and cause damage. If the gears are to be finish cut after the roughing operation, the chamfering cut is made deep enough to allow for the removal of further stock from the sides of the teeth in the finishing operation.

In the arrangement shown in the drawings, the chamfering tool 55 is adjusted so that it chamfers the side of a tooth immediately after it has been roughed out. Any other suitable arrangement of the tool might be made, however.

While a particular embodiment of the invention has been described, it will be understood that the invention is capable of various modifications and that this application is intended to cover any variations, uses or adaptations of the invention following, in general, the principles of the invention and including such departures from the present disclosure as come within known or customary practise in the art and as may be applied to the essential features hereinbefore set forth and as fall within the scope of the invention or the limits of the appended claims.

Having thus described my invention,

1. In a gear cutting machine, a work support, tool mechanism for cutting the teeth of a gear blank, separate tool mechanism for chamfering the teeth of the blank, and a common means for actuating said two tool mechanisms to effect cutting and chamfering operations.

2. In a gear cutting machine, the combination with means for cutting the teeth of a gear of means operable automatically in timed relation with the cutting means and, after each tooth is cut, to chamfer an end of a gear tooth.

3. In a gear cutting machine, a work support, mechanism for cutting teeth in a gear blank, mechanism for chamfering the teeth of the blank, means for producing a relative feed movement between the first named mechanism and the work support to effect cutting of the gear teeth, means for periodically separating the tool mechanism and the work support, means operable during the periods of withdrawal for indexing the work support and separate means also operable during the periods of withdrawal for actuating said chamfering mechanism.

4. In a gear cutting machine, a work support, a tool mechanism for cutting the teeth of a gear blank, chamfering mechanism for chamfering the teeth of the blank, and means controlling the operation of said tool and chamfering mechanisms so that the cutting and chamfering operations alternate.

5. In a gear cutting machine, a work support, a tool mechanism for cutting the teeth of a gear blank, chamfering mechanism for chamfering the teeth of the blank, means for imparting an alternate movement of feed and withdrawal between the first named tool mechanism and the work support, indexing mechanism for the work support, and a single means controlling the indexing and chamfering mechanisms to cause the operation of both during the periods of withdrawal between the first named tool mechanism and the work support.

6. In a gear cutting machine, a work support, a tool mechanism for cutting the teeth of the gear blank, chamfering mechanism for chamfering the teeth of the blank, means for imparting an alternate movement of feed and withdrawal between the tool mechanism and the work support, indexing mechanism for the work support, and a reciprocable member operable during the periods of withdrawal between the first named tool mechanism and the work support for actuating the index mechanism on movement in one direction and the chamfering mechanism on movement in the opposite direction.

7. The combination with a gear cutting machine provided with a tool mechanism and a work support and means for actuating the tool mechanism to effect cutting of the teeth of a gear blank, of a chamfering attachment for said machine comprising a support, a chamfering tool mounted thereon and means operable from the operating mechanism of said machine for controlling the operation of said chamfering mechanism.

8. In a gear cutting machine, a tool mechanism and a work support, means for actuating the tool mechanism, means for producing an alternate relative movement of feed and withdrawal between the tool mechanism and the work support, means for indexing the work support during the periods of withdrawal, a reciprocatory slide, a chamfering tool mounted on said slide, and means for operating said slide to effect chamfering operations, said last named means being operated in timed relation with the means for effecting the other operations of the machine.

9. The combination with a gear cutting machine provided with a work support and a tool mechanism for cutting teeth in the gear blank, means for producing an alternate movement of feed and withdrawal between the tool mechanism and the work support, an index mechanism for the work support, and an oscillatable rail for actuating said index mechanism, of a chamfering attachment for said machine comprising a support, a slide reciprocable in said support, a chamfering tool mounted on said slide, and means adapted to be operatively connected to said oscillatable rail for actuating said chamfering mechanism.

10. In a machine of the class described, a rotatable work spindle, and a chamfering mechanism comprising a guide member, a slide reciprocable thereon in a direction parallel to the axis of the work spindle, a tool block oscillatably mounted on said slide, a chamfering tool secured in said tool block so that its cutting edge is oblique to the direction of movement of the slide, means for reciprocating said slide, and means for oscillating said block as it is reciprocated whereby a swinging motion is imparted to the chamfering tool as it effects its cut.

11. In a gear cutting machine, a work support, a work spindle journaled in the work support, a tool support, a tool mechanism for cutting the teeth of a gear blank mounted on the tool support, means for indexing the work spindle, a guide member, a slide mounted on the guide member, a chamfering tool mounted on the slide, means for producing an alternate relative movement of feed and withdrawal between the tool mechanism and the work support, and a cam driven in timed relation with the last named means for operating said index mechanism and reciprocating said slide to effect indexing and a chamfering operation during the periods of separation of the work support and the first named tool mechanism.

12. In a gear cutting machine, a work support, mechanism for cutting the teeth of a gear blank, and separate mechanism for chamfering the teeth of said blank, the latter mechanism comprising a reciprocable and oscillatable tool support, a chamfering tool carried thereby, and means operable in timed relation with the tooth-cutting mechanism for actuating the tool support to effect chamfering operations.

13. An attachment for a gear cutting machine comprising a support removably attachable to the gear cutting machine, a slide reciprocable on said support, a chamfering tool mounted on said slide and operable on reciprocation to effect the chamfering operation, and means operatively connectible to an operating part of the machine for actuating said slide to effect chamfering operations.

14. An attachment for a gear cutting machine comprising a support removably attachable to a gear cutting machine, a slide reciprocable on said support, a tool block oscillatably mounted on the slide, and a chamfering tool mounted on the tool block, said tool block being operatively connectible to the machine to oscillate on reciprocation of said slide, and means operatively connectible to an operating part of the machine for reciprocating said slide to effect chamfering operations.

15. An attachment for a gear cutting machine comprising a support removably attachable to a gear cutting machine, a chamfering tool mounted on said support, and means operatively connectible to a moving part of the machine for actuating said chamfering tool.

16. In a gear cutting machine, a work support, a work spindle journaled in the work support, a tool mechanism for cutting the teeth of a gear blank carried by the work support, means for actuating the tool mechanism, means for producing an alternate relative movement of feed and withdrawal between the tool mechanism and the work support, indexing mechanism for the work spindle, a slide, a chamfering tool mounted on said slide, a crank member for reciprocating said slide, a reciprocable arm for actuating said index mechanism, and means carried by said arm for operating said crank to operate the slide which carries the chamfering tool.

17. In a gear cutting machine, a work support, a work spindle journaled in the work support, tool mechanism for cutting the teeth of a gear blank, means for actuating the tool mechanism, means for producing an alternate relative movement of feed and withdrawal between the tool mechanism and the work support, indexing mechanism for the work spindle, a slide, a chamfering tool mounted on said slide, a crank member for reciprocating said slide, a lever for operating said crank, a reciprocable arm for actuating the index mechanism, actuating means for reciprocating said arm during the withdrawal motion, a cam member pivotally mounted on said arm and resiliently held in position to operate said lever, said cam member being so formed that on movement of the arm in one direction it is swung out of operative position but on movement of the arm in the opposite direction it returns to operative position to operate said lever and thereby effect a chamfering operation.

18. In a machine for producing gears, tool mechanism, a work support, means for actuating the tool mechanism, means for producing relative movements of feed and withdrawal between the tool mechanism and the work support, tooth surfaces of the blank being cut during the relative movements of feed, means operable to chamfer teeth of the blank during the periodic separations of the tool mechanism and work support, means for indexing the blank during said periodic separations, and a common means for actuating the chamfering and indexing mechanisms constructed so that indexing takes place before chamfering.

19. In a machine for producing tapered gears, a frame, a tool support and a work support mounted on the frame, one of said supports being angularly adjustable on the frame to position the blank in proper cutting relation to the tool mechanism, said tool mechanism comprising a face mill cutter which is journaled in the tool support, means for rotating said cutter, chamfering mechanism comprising a tool reciprocable in a direction inclined to an end face of the teeth of the blank, means for producing alternate movements of feed and withdrawal between the first named tool mechanism and the work support, means for actuating the chamfering mechanism during the periods of withdrawal and means for indexing the work support also during the periods of withdrawal.

20. In a machine for producing tapered gears, a frame, a tool support and a work support mounted on the frame, one of said supports being angularly adjustable on the frame to adjust the blank in proper cutting position, a face mill cutter journaled in the tool support, means for alternately feeding the cutter into and withdrawing it from engagement with the blank to cut tooth surfaces on the blank on the feed strokes, separate mechanism for chamfering the teeth of the blank, and means for actuating the chamfering mechanism to chamfer the teeth of the blank during the periods of withdrawal of the face mill cutter from the blank and to withdraw it from engagement with the blank during the period in which the face mill cutter is in engagement with the blank, and means for indexing the blank during the periods of withdrawal.

21. In a machine for producing tapered gears, a frame, a tool support and a work support mounted on the frame, one of said supports being adjustable angularly on the frame to adjust the blank into proper cutting position, tool mechanism mounted on the tool support for cutting tooth surfaces of the blank, a work spindle journaled in the work support, means for producing alternate relative movements of feed and withdrawal between the tool mechanism and the work support, a chamfering tool, means for moving said tool in a direction parallel to the axis of the work spindle to effect chamfering operations, and means timing the relative motions of the tool and work supports and of the chamfering tool so that the chamfering tool operates only during the periods of withdrawal between the first tool mechanism and the blank.

22. In a machine for producing tapered gears, a frame, a tool support and a work support mounted on the frame, tool mechanism mounted on the tool support for cutting tooth surfaces of the blank, a work spindle journaled in the work support, means for producing alternate relative movements of feed and withdrawal between the tool and work supports, a chamfering tool, means for moving said chamfering tool in a straight line parallel to the axis of the work spindle and for simultaneously rocking the chamfering tool about an axis perpendicular to the direction of its rectilinear movement to effect the chamfering operations and means timing the relative motions of the tool and work supports and of the chamfering tool so that chamfering takes place only during the periods of withdrawal of the first tool mechanism from engagement with the blank.

23. In a machine for producing tapered gears, a frame, a tool support and a work support mounted on the frame, tool mechanism mounted on the tool support for cutting tooth surfaces of the blank, a work spindle journaled in the work support, means for producing an alternate relative movement of feed and withdrawal between the tool and work supports, a chamfering tool, means for moving the chamfering tool in a direction inclined to an end face of the teeth of the blank to effect the chamfering operation, and means timing the relative movements of the tool and work supports and of the chamfering tool so that chamfering takes place only during the periods of withdrawal of the first-named tool mechanism from engagement with the blank.

24. In a machine for producing tapered gears, a frame, a tool support and a work support mounted on the frame, tool mechanism mounted on the tool support for cutting tooth surfaces of the blank, a work spindle journaled in the work support, means for producing an alternate relative movement of feed and withdrawal between the tool and work supports, a chamfering tool, means for moving said chamfering tool in a straight line in a direction inclined to an end face of the teeth of the blank, and means operable on said movement to swing the chamfering tool about an axis perpendicular to the line of its rectilinear movement.

25. Mechanism for chamfering gears comprising a work support, a chamfering tool, means for moving said tool in a straight line inclined at an acute angle to a side and an end face of a tooth of the gear to be chamfered and for swinging said tool simultaneously about an axis inclined to the line of its rectilinear movement to effect the chamfering operation.

26. In a machine for producing gears, a frame, a tool support and a work support mounted on the frame, tool mechanism mounted on the tool support for cutting tooth surfaces of the blank, a slide mounted on the frame, an oscillatable tool block mounted on the slide and adapted to have a chamfering tool secured thereto, an arm secured at one end to the tool block, means on the frame on which the free end of said arm is adapted to fulcrum, spring means for holding the free end of said arm in contact with said fulcrum, and means for reciprocating said slide to impart the combined rectilinear and rocking movements to the chamfering tool to chamfer the tooth surfaces of the blank.

27. An attachment for a gear cutting machine comprising a support removably attachable to the machine, a chamfering tool mounted on said support, and means operatively connectible to a moving part of the machine for controlling the operation of said chamfering tool so that chamfering takes place alternately with the tooth cutting operation of the machine.

MAXWELL H. HILL